United States Patent
Mikhemar et al.

(10) Patent No.: US 9,191,049 B2
(45) Date of Patent: Nov. 17, 2015

(54) METHOD AND APPARATUS FOR ADAPTIVE CANCELLATION OF DISTORTION AND PHASE NOISE

(75) Inventors: Mohyee Mikhemar, Aliso Viejo, CA (US); Hooman Darabi, Laguna Niguel, CA (US)

(73) Assignee: Broadcom Corporation, Irvine, CA (US)

(*) Notice: Subject to any disclaimer, the term of this patent is extended or adjusted under 35 U.S.C. 154(b) by 461 days.

(21) Appl. No.: 13/470,123

(22) Filed: May 11, 2012

(65) Prior Publication Data

US 2013/0303103 A1    Nov. 14, 2013

(51) Int. Cl.
  *H04B 1/10* (2006.01)
  *H04B 1/12* (2006.01)

(52) U.S. Cl.
  CPC ...................................... *H04B 1/123* (2013.01)

(58) Field of Classification Search
  CPC ...... H04B 1/123; H04B 1/1081; H04B 1/126; H04B 1/10; H04B 1/1027; H04B 1/30; H04B 1/18; H04B 1/12; H04B 1/109; H04B 17/0042; H04B 17/0057; H04B 1/1036; H04B 15/00; H04B 1/1669; H04B 1/26; H04B 1/001; H04B 1/0017; H04B 1/71075; H03H 11/1291; H03H 7/0115; H03D 7/165; H04W 24/00; H04W 24/08; H04L 1/0026
  USPC .................. 455/303–307, 296, 67.11–67.14, 455/226.1–226.4
  See application file for complete search history.

(56) References Cited

U.S. PATENT DOCUMENTS

| | | | | |
|---|---|---|---|---|
| 4,177,430 | A * | 12/1979 | Paul .............................. | 455/306 |
| 5,134,723 | A * | 7/1992 | Carson ......................... | 455/254 |
| 7,941,093 | B2 * | 5/2011 | Nilsson ......................... | 455/20 |
| 2010/0316172 | A1 * | 12/2010 | Keehr et al. .................. | 375/344 |

* cited by examiner

*Primary Examiner* — Lana N Le
(74) *Attorney, Agent, or Firm* — Brinks Gilson & Lione

(57) ABSTRACT

An adaptive cancellation circuit and method are provided. The circuit includes a main path and an auxiliary path. The main path includes a first amplifier configured to output a first amplified signal to a first mixer. The main path is configured to output a first signal comprising a wanted signal component and a distortion component. The auxiliary path includes a second amplifier configured to output a second amplified signal to a second mixer. The second mixer is connected to a filter configured to remove the wanted signal component. The auxiliary path is configured to output a second signal including the distortion component.

17 Claims, 4 Drawing Sheets

METHOD AND APPARATUS FOR ADAPTIVE CANCELLATION OF DISTORTION AND PHASE NOISE

TECHNICAL FIELD

This disclosure relates generally to communication. More particularly, it relates to a mixed-signal distortion cancellation circuit capable of simultaneously cancelling distortion and reciprocal mixing cause by local oscillator phase noise.

BACKGROUND

Mixers are widely used in communication systems to modulate and demodulate signals. Oftentimes, a mixer may cause undesired intermodulation distortion in the communication system because of its inherent nonlinear property. The intermodulation distortion includes the amplitude modulation of signals containing two or more different frequencies. The intermodulation between each frequency component will form additional signals at frequencies that are not just at harmonic frequencies (integer multiples) of either frequency component, but also at the sum and difference frequencies of the original frequencies and at multiples of those sum and difference frequencies.

BRIEF DESCRIPTION OF THE DRAWINGS

The disclosed method and apparatus may be better understood with reference to the following drawings and description. In the figures, like reference numerals designate corresponding parts throughout the different views.

DETAILED DESCRIPTION

Generally, intermodulation distortion can be caused by nonlinear behavior of the signal processing being used. The theoretical outcome of these nonlinearities can be calculated by generating a Volterra series of the characteristic, while the usual approximation of those nonlinearities can be obtained by generating a Taylor series. The distortion may include a second-order intermodulation such as the self-mixing of an AM-modulated blocker or the mixing of two blockers in the presence of the second-order nonlinearity of the mixers. The distortion may include a third-order intermodulation such as the mixing of two blockers in the presence of third-order nonlinearity of two amplifiers. The distortion may further include reciprocal-mixing such as the mixing of a strong blocker with the phase noise of the local oscillator.

Intermodulation may not be desirable in radio or audio processing, as it can create unwanted spurious emissions, often in the form of sidebands.

Phase noise is a frequency domain representation of rapid, short-term, random fluctuations in the phase of a waveform, caused by time domain instabilities. Ideally, an oscillator generates a pure sine wave at a single frequency. In reality, however, real oscillators can have phase modulated noise components. The phase noise components spread the power of a signal to adjacent frequencies, resulting in noise sidebands. Oscillator phase noise often includes low frequency flicker noise and may also include white noise.

The description below relates to a circuit and a corresponding method, apparatus and/or system to adaptively remove undesired intermodulation distortion and phase noise in a radio communication system or signal processing system. The circuit includes a main path and an auxiliary path. The main path includes a first amplifier configured to output a first amplified signal to a first mixer. The main path is configured to output a first signal comprising a wanted signal component and a distortion component. The auxiliary path includes a second amplifier configured to output a second amplified signal to a second mixer. The second mixer is connected to a filter configured to remove the wanted signal component. The auxiliary path is configured to output a second signal including the distortion component.

Figure 1:
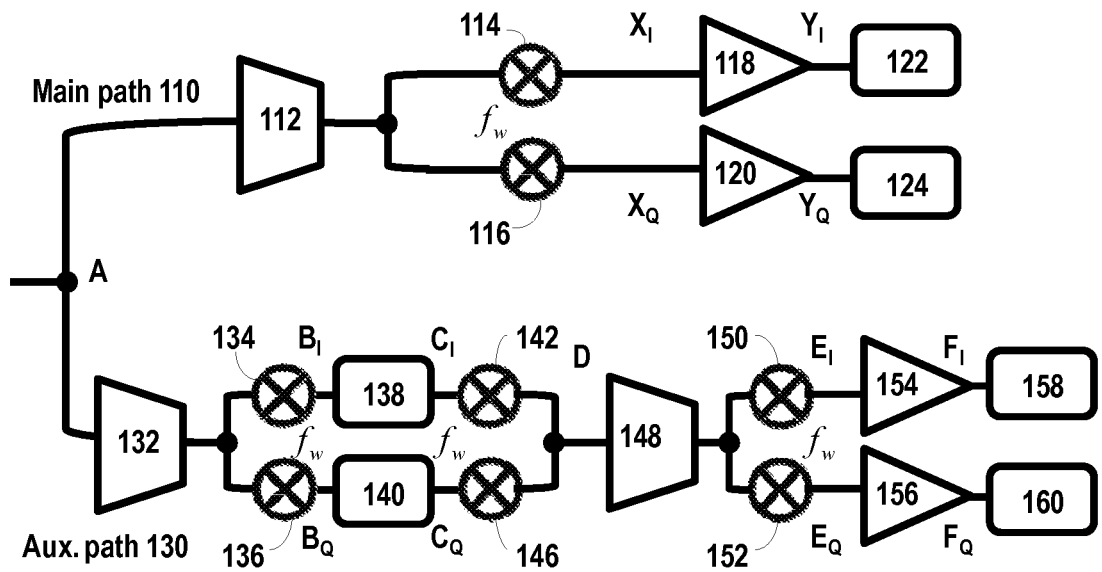
FIG. 1 is a block diagram of an exemplary adaptive cancellation circuit.

FIG. 1 is a block diagram of an exemplary adaptive cancellation circuit. The adaptive cancellation circuit may be a part of a smart phone, a laptop, a tablet, or any other communication device. The adaptive cancellation circuit includes a main path 110 and an auxiliary path 130. The input signal $V_A(t)$ at point A has the wanted signal $V_{w,RF}(t)$ that includes transmitted information along with one or more blockers $V_{b,RF}(t)$. The wanted signal $V_{w,RF}(t)$ and the blockers $V_{b,RF}(t)$ may be modeled to be at different frequency bands. Thus, it is possible to use a band pass filter to remove the wanted signal $V_{w,RF}(t)$ initially.

The main path 110 includes a first amplifier 112 receiving the input signal $V_A(t)$. The first amplifier 112 may be a transconductance amplifier configured to output a first amplified signal to a mixer 114 in the I channel and a mixer 116 in the Q channel. Either of the mixers 114 and 116 also receives a frequency signal at frequency $f_w$ from a local oscillator. The mixer 114 then outputs a demodulated signal $X_I$ to an amplifier 118 in the I channel and the mixer 116 outputs a demodulated signal $X_Q$ to an amplifier 120 in the Q channel. The amplifier 118 may be a transimpedance amplifier (TIA) configured to convert the demodulated current signal $X_I$ to an analog voltage signal $Y_I$. The amplifier 120 may be a TIA configured to convert the demodulated current signal $X_Q$ to an analog voltage signal $Y_Q$.

The analog signal voltage signal $Y_I$ is then sent to an analog-to-digital converter 122 and the analog signal voltage signal $Y_Q$ is then sent to an analog-to-digital converter 124. The analog-to-digital converters 122 and 124 are configured to convert the analog voltage signals $Y_I$ and $Y_Q$ to the output signals of the main path 110. Because of the nonlinearity of circuit components in the main path, the output signal in either I channel or Q channel includes a wanted signal component and a distortion component. The wanted signal component corresponds to the wanted signal $V_{w,RF}(t)$ and the distortion component corresponds to $V_{b,RF}(t)$. However, it can be very difficult to remove the distortion component by filtering only at the output end of the main path 110 because the blocker signal may have been spread over the entire frequency band after passing the different circuit components.

The auxiliary path 130 is introduced to provide an estimate of the distortion component. In FIG. 1, the auxiliary path 130 includes a second amplifier 132 receiving the input signal $V_A(t)$. The second amplifier 132 may be a transconductance amplifier configured to output a second amplified signal to a mixer 134 in the I channel and a mixer 136 in the Q channel. Either of the mixers 134 and 136 also receives a frequency signal at frequency $f_w$ from a local oscillator. The mixer 134 then outputs a demodulated signal $X_{B,I}(t)$ to a filter 138 in the I channel and the mixer 136 outputs a demodulated signal $X_{B,Q}(t)$ to a filter 140 in the Q channel. The filter 138 or 140 may be one of a combination of the following filters: a band pass filter, a low pass filter, and a high pass filter. The filters 138 and 140 are configured to remove the wanted signal component in the frequency domain. The filtered signals $X_{C,I}(t)$ and $X_{B,Q}(t)$ are then respectively output to mixers 142 and 146. The mixers 142 and 146 modulate the filtered signal by using the same frequency signal at frequency $f_w$ from the local oscillator. In the frequency domain, the signal output from the mixers 142 and 146 includes only the blocker signal component $V_{b,RF}(t)$.

The auxiliary path 130 further includes a plurality of components having the same circuit components as in the main path. The plurality of components include a third amplifier 148. The third amplifier 148 may be a transconductance amplifier configured to output the amplified signal to a mixer 150 in the I channel and a mixer 152 in the Q channel. The mixers 150 and 152 demodulate the amplified signal by using a frequency signal at frequency $f_w$ from the local oscillator. The demodulated signals $X_{E,I}(t)$ and $X_{E,Q}(t)$ are then respectively output to an amplifier 154 in the I channel and an amplifier 156 in the Q channel. The amplified signals $X_{F,I}(t)$ and $X_{F,Q}(t)$ are then respectively output to an analog-to-digital converters 158 and an analog-to-digital converters 160. The final output of the auxiliary path 130 only includes the distortion component corresponding to the block signal.

Figure 2:
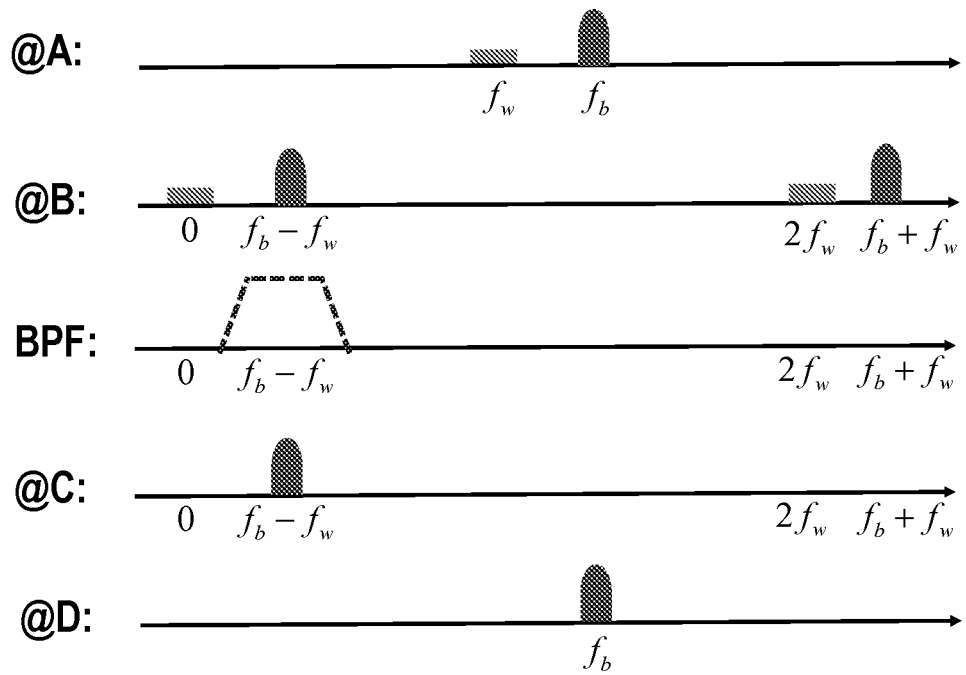
FIG. 2 is a signal diagram showing exemplary signals at different stage of the circuit of FIG. 1 in the frequency domain.

FIG. 2 is a signal diagram showing exemplary signals at different stage of the circuit of FIG. 1 in the frequency domain. At the point A, the input signal may be modeled as following: $V_A(t)=V_{w,RF}(t)+V_{b,RF}(t)+V_{b2,RF}(t)+\ldots$.

where $V_{w,RF}(t)=A_w(t)\cos(2\pi f_w t+\theta_w(t))$, $V_{b,RF}(t)=A_b(t)\cos(2\pi f_b t+\theta_b(t))$. The wanted signal has a frequency $f_w$ and includes amplitude-modulation information $A_w$ and phase-modulation information $\theta_w(t)$. The blocker has a frequency $f_w$ and includes amplitude-modulation information $A_w$ and phase-modulation information $\theta_w(t)$.

At point B, the modulated signal $V_B(t)$ includes a component in the low frequency and a component in the high frequency band at around $2f_w$.

A band path filter (BPF) may be used to select the blocker component near the low frequency. At point C, the filtered signal only includes the blocker component. At point D, the blocker component is modulated by $f_w$ to the original frequency as at point A. The signals at different points in FIG. 2 are for illustration only, the real signals may include other frequency components.

Figure 3:
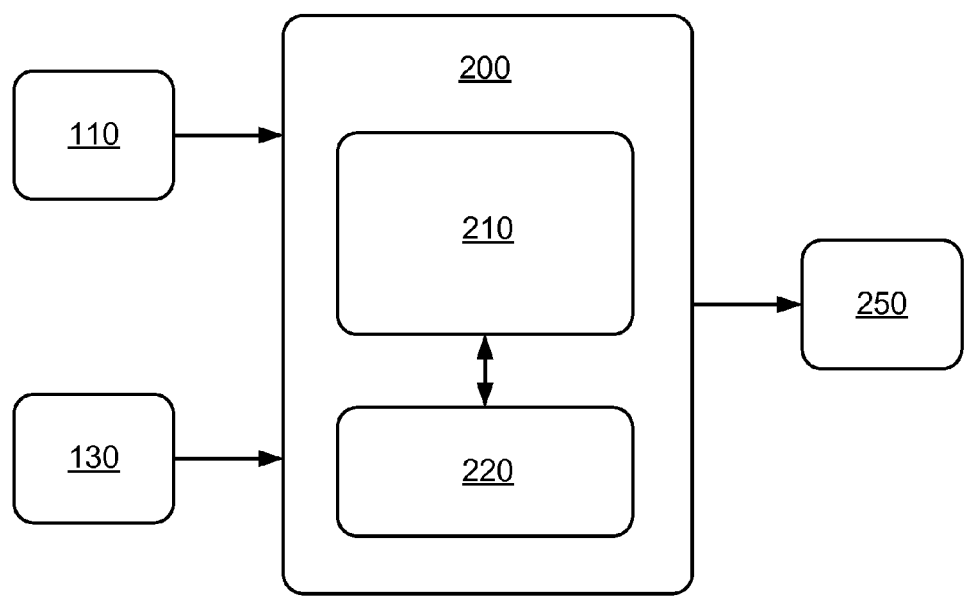
FIG. 3 is a block diagram of an exemplary top-level architecture.

FIG. 3 is a block diagram of an exemplary top-level architecture such as for apparatus 200. The apparatus 200 includes a processor 210 coupled with a memory 220. The apparatus 200 receives a first signal or signals from the main path 110 and a second signal or signals from the auxiliary path 130. The processor then load stored program code from the memory 220 to obtain a plurality of coefficients by minimizing a cross-correlation between the first signal and the second signal. The processor may also just load pre-stored coefficients from the memory. The processor then linearly combines the first signal and the second signal using the obtained coefficients and output a linear combination of the first signal and the second signal to the next component 250 such as a decoder.

Figure 4:
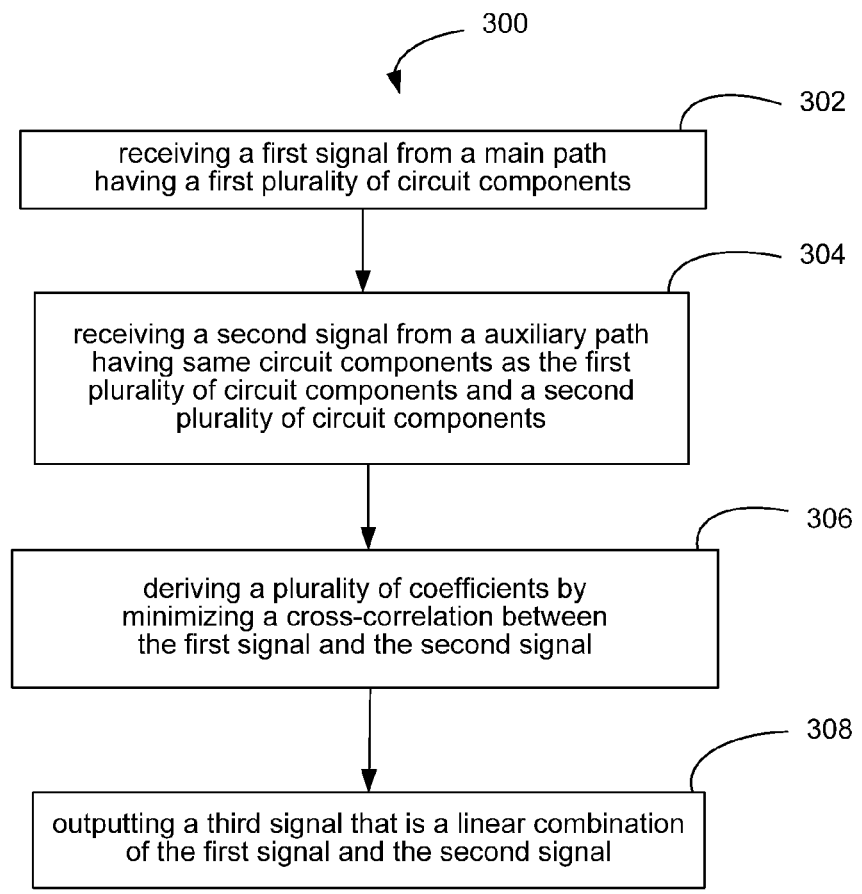
FIG. 4 is a flow chart of an exemplary logic.

FIG. 4 is a flow chart of an exemplary logic 300 for using the apparatus 200. In the logic 300, the processor may implement the following blocks in different order. In block 302, the processor receives a first signal from a main path having a first plurality of circuit components. The first plurality of circuit components include a first amplifier configured to output a first amplified signal to a first mixer, the main path configured to output the first signal including a wanted signal component and a distortion component.

In block 304, the processor receives a second signal from an auxiliary path having same circuit components as the first plurality of circuit components and a second plurality of circuit components. The second plurality of circuit components includes a filter configured to remove the wanted signal component from the auxiliary path. Thus, the second signal includes a distortion signal generated by the first plurality of circuit components. The second plurality of circuit components further includes a second amplifier configured to output a second amplified signal to a second mixer, the second mixer connected to the filter.

In block 306, the processor derives a plurality of coefficients by minimizing a cross-correlation between the first signal and the second signal.

In block 308, the processor outputs a third signal that is a linear combination of the first signal and the second signal using the derived coefficients from block 306 or directly loaded from a memory device.

Figure 5:
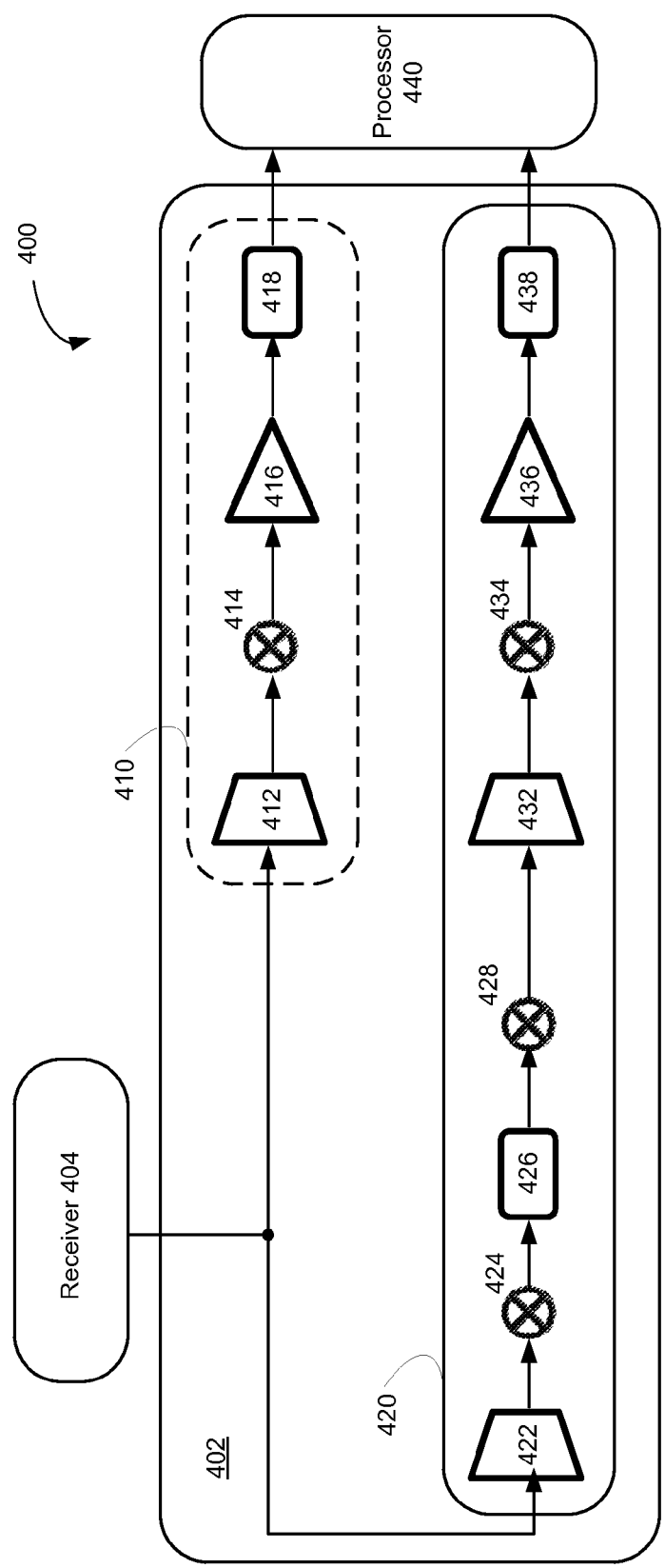
FIG. 5 is a block diagram of an exemplary communication system including an adaptive cancellation circuit.

FIG. 5 is a block diagram of an exemplary communication system 400 including an adaptive cancellation circuit 402. The communication system 400 also includes a receiver 404 configured to receive a signal from other communication systems. The receiver 404 then sends the received signal to the main path 410 and the auxiliary path 420.

The main path 410 includes a first amplifier 412 configured to amplify the input signal and output a first amplified signal to a first mixer 414. The first mixer 414 outputs a demodulated signal to a first transimpedance amplifier 416 configure to output an amplified signal to an ADC 418. The ADC 418 in the main path 410 is configured to output a first signal including a wanted signal component and a distortion component.

The auxiliary path 420 includes a second amplifier 422 configured to amplify the input signal and output a second amplified signal to a second mixer 424. The second mixer 424 is connected to a filter 426 configured to remove the wanted signal component. The filter 426 may be a band pass filter or any filter corresponds to the frequency of the wanted signal. The auxiliary path 420 includes a third mixer 428 configured to receive a filtered signal from the filter 426 and output a third signal to a third amplifier 432. The third amplifier 432 then outputs a third amplified signal to a fourth mixer 434 configured to demodulate the third amplified signal. The auxiliary path 420 also includes a second transimpedance amplifier 436 connected to the fourth mixer 434. The second transimpedance amplifier 436 outputs an amplified signal to an ADC 438.

The first, second, and third amplifiers 412, 422, and 432 may include an analog transconductance amplifier. The ADC 438 in the auxiliary path 420 is configured to output a second signal comprising the distortion component.

The cancellation circuit 402 outputs the first and second signals to a processor 440 for further processing. The processor 440 may then derives a coefficient by offline estimation or online estimation. For example, in offline estimation, the processor 440 may apply a known wanted signal and a known blocker to the communication system 400 and estimate the coefficients offline by looking at the outputs of the main and auxiliary paths 410 and 420. These predetermined coefficients may be stored in a memory device accessible by the processor 440. The processor 440 may use the pre-calculated values for correction of unknown blockers and wanted signals.

In online estimation, the processor may first set coefficients to initial guess and then derive a cross-correlation of the first signal from the main path 410 and the second signal from the auxiliary path 420. The processor may also update the coefficients by minimizing a cross-correlation between the first and second signals.

With the coefficients derived by offline estimation or online estimation, the processor is configured to output a third signal that is a linear combination of the first signal and the second signal.

The methods, devices, and logic described above may be implemented in many different ways in many different combinations of hardware, software or both hardware and software. For example, all or parts of the apparatus may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the apparatus described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the apparatus may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the disclosure have been described, it will be apparent to those of ordinary skill in the art that many more embodiments and implementations are possible within the scope of the disclosure.

What is claimed is:

1. A circuit, comprising:
a local oscillator configured to generate a frequency signal with a phase noise component;
a main path comprising the local oscillator and a first amplifier configured to output a first amplified signal to a first mixer, the first mixer configured to generate a main path demodulated signal from first amplified signal using the frequency signal from the local oscillator, the main path further comprising a transimpedance amplifier configured to convert the main path demodulated signal to a main path signal comprising a wanted signal component and a distortion component at least partially caused by the phase noise component; and
an auxiliary path comprising the local oscillator and a second amplifier configured to output a second amplified signal to a second mixer that outputs an auxiliary path demodulated signal, the second mixer in communication with a filter configured to remove a frequency band corresponding to the wanted signal component from the auxiliary path demodulated signal,
wherein the auxiliary path is configured to output an auxiliary path signal comprising an estimate of the distortion component at least partially caused by the phase noise component, and wherein the transimpedance amplifier is configured to output a first analog voltage signal to a first analog-to-digital converter that converts the first analog voltage signal to the main path signal.

2. The circuit of claim 1, wherein the auxiliary path comprises a third mixer configured to receive a filtered signal from the filter and output a third signal to a third amplifier.

3. The circuit of claim 2, wherein the third amplifier is configured to output a third amplified signal to a fourth mixer configured to demodulate the third amplified signal.

4. The circuit of claim 3, wherein the first, second, or third amplifier, or any combination thereof comprises an analog transconductance amplifier.

5. The circuit of claim 3, wherein the auxiliary path further comprises a second transimpedance amplifier in communication with the fourth mixer, the second transimpedance amplifier configured to convert a second demodulated current signal to a second analog voltage signal.

6. The circuit of claim 5, wherein the second transimpedance amplifier is configured to output the second analog voltage signal to a second analog-to-digital converter that converts the second analog voltage signal to the auxiliary path signal.

7. A communication system, comprising:
a receiver configured to receive an input signal;
a local oscillator configured to generate a frequency signal with a phase noise component;
a main path comprising a first amplifier configured to amplify the input signal and output a first amplified signal to a first mixer, the first mixer configured to generate a main path demodulated signal from first amplified signal using the frequency signal from the local oscillator, the main path further comprising a transimpedance amplifier configured to convert the main path demodulated signal to a main path signal comprising a wanted signal component and a distortion component at least partially caused by the phase noise component; and
an auxiliary path comprising a second amplifier configured to amplify the input signal and output a second amplified signal to a second mixer that outputs an auxiliary path demodulated signal, the second mixer in communication with a filter configured to remove a frequency band corresponding to the wanted signal component from the auxiliary path demodulated signal,
wherein the auxiliary path is configured to output an auxiliary path signal comprising an estimate of the distortion component at least partially caused by the phase noise component;
wherein the auxiliary path comprises a third mixer configured to receive a filtered signal from the filter and output a third signal to a third amplifier; and
wherein the transimpedance amplifier is configured to output a first analog voltage signal to a first analog-to-digital converter that converts the first analog voltage signal to the main path signal.

8. The system of claim 7, wherein the system comprises a processor that is configured to output an output signal that is a linear combination of the main path signal and the auxiliary path signal.

9. The system of claim 8, wherein the linear combination comprises a coefficient configured to reduce cross-correlation between the main path signal and the auxiliary path signal.

10. The system of claim 7, wherein:
the third amplifier is configured to output a third amplified signal to a fourth mixer configured to demodulate the third amplified signal;
the auxiliary path further comprises a second transimpedance amplifier in communication with the fourth mixer; and
the first, second, or third amplifier, or any combination thereof comprises an analog transconductance amplifier.

11. A device, comprising:
a local oscillator configured to generate a frequency signal with a phase noise component;
a main circuit path comprising a first set of circuit components, the first set of circuit components comprising a first amplifier configured to output a first amplified signal to a first mixer, the first mixer configured to demodulate the first amplified signal using the frequency signal from the local oscillator, the main path configured to output a main path signal comprising a wanted signal component and a distortion component at least partially caused by the phase noise component;
an auxiliary circuit path comprising a second set of circuit components that match the first set of circuit components and a third set of circuit components, the auxiliary circuit path configured to output an auxiliary path signal comprising an estimate of the distortion component at least partially caused by the phase noise component; and
a processor configured to generate an output signal that is a linear combination of the main path signal and the auxiliary path signal,
wherein the device is configured to derive a coefficient for the linear combination by reducing a cross-correlation between the main path signal and the auxiliary path signal.

12. The device of claim 11, wherein the main path further comprises a first transimpedance amplifier in communication with the first mixer.

13. The device of claim 12, wherein the third set of circuit components comprises a filter configured to remove a frequency band corresponding to the wanted signal component from the auxiliary path.

14. The device of claim 13, wherein the second set of circuit components further comprises a second amplifier configured to output a second amplified signal to a second mixer.

15. The device of claim 14, wherein the auxiliary path comprises a third mixer configured to receive a filtered signal from the filter and output a third signal to a third amplifier.

16. The device of claim 15, wherein the first, second, or third amplifier, or any combination thereof comprises an analog transconductance amplifier.

17. The device of claim 16, wherein the first transimpedance amplifier is configured to convert a first demodulated current signal to a first analog voltage signal.

* * * * *